(12) United States Patent
Drouin et al.

(10) Patent No.: US 7,787,210 B1
(45) Date of Patent: Aug. 31, 2010

(54) FEED-FORWARD METHOD FOR REPEATABLE RUNOUT CANCELLATION

(75) Inventors: David Drouin, Milpitas, CA (US); Billy Wahng, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/381,817

(22) Filed: Mar. 17, 2009

(51) Int. Cl.
*G11B 5/596* (2006.01)
(52) U.S. Cl. .............................. 360/77.04; 360/77.08
(58) Field of Classification Search ................. None
See application file for complete search history.

(56) References Cited

U.S. PATENT DOCUMENTS

| | | | |
|---|---|---|---|
| 5,550,685 A | 8/1996 | Drouin | |
| 5,854,722 A | 12/1998 | Cunningham et al. | |
| 6,574,067 B2 * | 6/2003 | Chen et al. | ............... 360/77.04 |
| 6,700,728 B2 | 3/2004 | Smith et al. | |
| 6,826,006 B1 | 11/2004 | Melkote et al. | |
| 6,924,959 B1 | 8/2005 | Melkote et al. | |
| 6,999,267 B1 | 2/2006 | Melkote et al. | |
| 7,042,827 B2 | 5/2006 | Cho et al. | |
| 7,196,864 B1 | 3/2007 | Yi et al. | |
| 7,286,317 B1 | 10/2007 | Li et al. | |
| 2005/0094307 A1* | 5/2005 | Iwashiro | .................. 360/77.04 |
| 2006/0066985 A1* | 3/2006 | Hirano et al. | ............ 360/77.03 |
| 2007/0230024 A1* | 10/2007 | Wong | ...................... 360/77.04 |

* cited by examiner

*Primary Examiner*—Andrew L Sniezek
(74) *Attorney, Agent, or Firm*—Saile Ackerman LLC; Stephen B. Ackerman

(57) ABSTRACT

A magnetic hard disk drive includes a method for eliminating that portion of track following error by a read/write transducer that is caused by repeatable runout of the disk tracks. The repeatable runout is eliminated by application of an iterative algorithm that calculates feed-forward correction terms based on gain coefficients iteratively calculated from the amplitude and phase portions of a Bode plot characterizing the system. The corrective coefficients can be inserted into the hard disk drive at a summing junction that redefines the centerline of the track, or at a summing junction that causes the actuator to follow the repeatable runout and make non-repeatable runout corrections relative thereto.

28 Claims, 7 Drawing Sheets

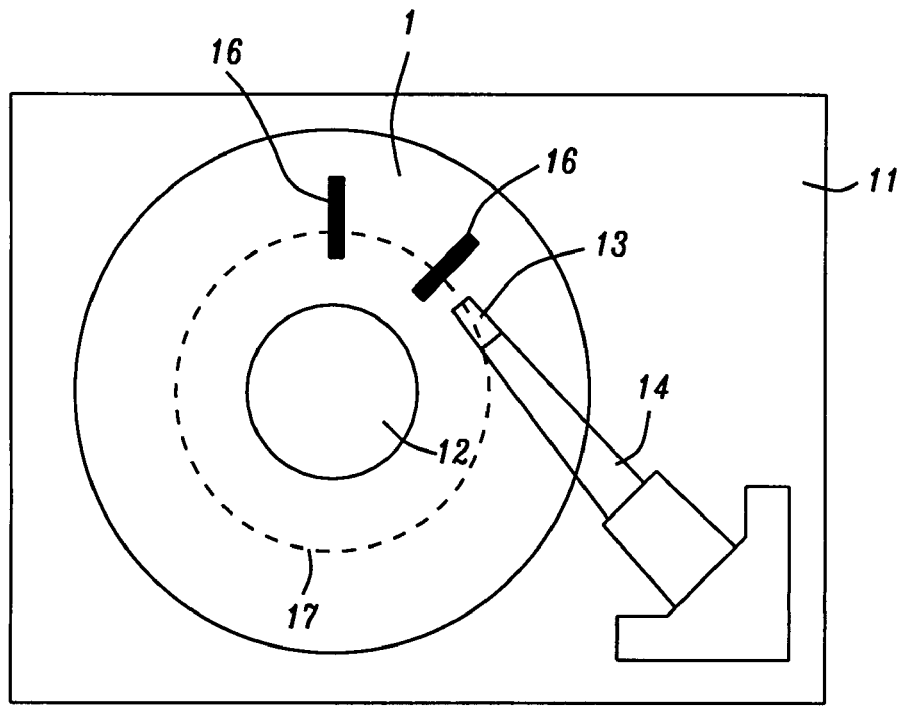
FIG. 1 – Prior Art
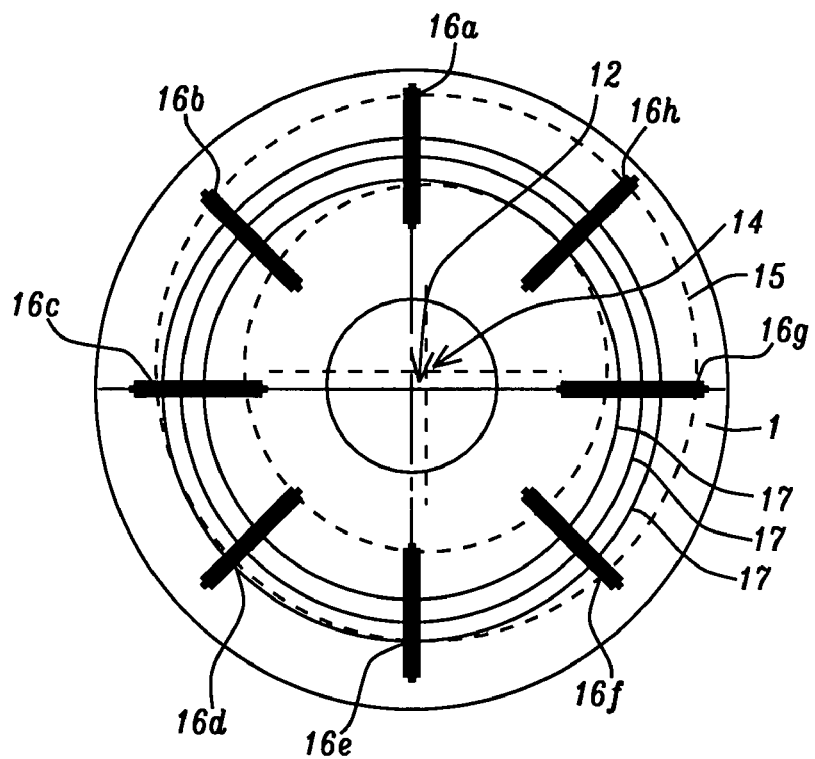
FIG. 2 – Prior Art

```
C-Code Implementation
CONST    WedgesPerRev,         //Number of servo wedges per revolution
CONST    AFF TERMS = 5,        //Number of gain coeffiients
INT16    Wedgenumber,          //The current servo wedge number
INT16    filteredPES,          //The PES value at the current wedge
INT32    FF[WedgesPerRev],     //Array of wedge FF accumulation values - an
                               //  element for each wedge
                               //Array of gain values - one for each coefficient term
INT16    FFGain[AFF TERMS] * (590,161,-271,-268,-111),
INT16    FFShift * 3,          //Arithmetic shift value corresponding to a gain of
                               //  2*(-FFShift)
INT16    FFShiftx * 15,        //Arithmetic shift value corresponding to a gain of
                               //  2*(-FFShiftx)
INT16    FFDelay * 2,          //Phase delay expressed as number of servo wedges
BOOL     ApplyOn * TRUE,       //Enables and disables the FF output
BOOL     AcquireOn * True,     //Enables and disables the FF adaptation
INT16    FFout,                //The FF output value
void FF(void)
{
        INT16  i,
        INT16  j,
        INT16  k, FFout * 0,
        if(ApplyOn == TRUE)
        {
                // Compute phase delayed index into wedge FF array,
                i = WedgeNumber + FFDelay,
                // Repeat for eah of the gain coefficient terms,
                for (j = 0, j = AFF Terms, j++)
                {
                        // Wrap around the wedge FF array index if needed,
                        if (i >= WedgesPerRev) i -= WedgesPerRev,
                        // Scale the FF value and limit the result to within a range,
                        k = FF[i] >> FFShift,
                        if (k > 0x7FFFF) K = -0x7FFF.
                        else if (k < -0x7FFFF) k = - 0x7FFFF,
                        // Compute this coefficient's contribution to FFout and add it,
                        FFout += (k * FFGain(j)) >> FFShiftx,
                        // Point to next wedge FF value,
                        i++,
                }
        }
        if (AcquireOn == TRUE)
        {
                // Limit the PES value for accumulation,
                k = filterdPES,
                if (k > 0x7FFF) k = 0x7FFF
                else if (k < -0x7FFF) k = - 0x7FFF,
                // Accumulate the PES of the current wedge,
                FF(WedgeNumber) += k,
```

FIG. 6

|  | PES 3 Sigma | PES Max | PES Min | RRO 3 Sigma | RRO Max | RRO Min |
| --- | --- | --- | --- | --- | --- | --- |
| FF Disabled | 9.427 | 11.480 | -11.431 | 7.543 | 7.359 | -6.429 |
| FF Enabled | 5.919 | 9.101 | -8.991 | 2.296 | 2.699 | -2.852 |
| Improvement (%) | 37.21% | 20.72% | 21.35% | 69.56% | 63.32% | 55.64% |

FIG. 7

FEED-FORWARD METHOD FOR REPEATABLE RUNOUT CANCELLATION

BACKGROUND OF THE INVENTION

1. Field of the Invention

This invention relates generally to a magnetic recording device in which there is a rotating magnetic disk on which servo information has been written to guide the positioning of a read/write transducer. More particularly, it relates to such a device wherein the use of the servo information has been optimized to cancel the effects of repeatable runout (RRO).

2. Description of the Related Art

As shown schematically in FIG. 1, a typical magnetic disk (1) mounted on a rotatable spindle (12) in a hard disk drive (HDD) (11) is characterized by radially concentric, annular, circular tracks (17) on which data can be written and from which data is read by means of a read/write transducer (13) mounted on an actuator assembly (14). In order to for the read/write transducer to accurately follow such a circular track while executing reading and writing operations, i.e., to maintain a fixed radial position over the centerline of the track as the disk rotates, it is necessary to be able to position the head precisely at various places on the disk. Such positioning is typically accomplished by means of a closed loop servo-mechanism (not shown), which is a mechanism that accepts an input signal indicating an actual position of the transducer over a track, then determines the position at which the transducer should actually be positioned (typically the radial centerline of the track) and feeds back a correction related to the difference between the intended and actual positions which can be used to reposition the transducer. The signal produced by the difference between the intended and actual positions is called a position error signal, PES and, since it is typically digital in nature, it is processed by a DSP to compute a correction signal which is fed into a digital to analog converter (DAC) which then sends a corresponding analog signal to a voice coil activator (VCA) that finally repositions the transducer as necessary. The mechanism by which such a PES is obtained is through the use of imprinted data on the disk, called servo data. This servo data is recorded on periodically repeated, small angular wedges (16) located within each annular track. Two such wedges are shown here and, for simplicity, they are indicated as rectangular in shape. The servo data is in the form of "bursts" of magnetic transitions (small changes in magnetization) that are typically both radially and angularly separated from each other within each wedge. As the disk rotates and the transducer passes over each such wedge, also referred to as a servo sector, it reads its position relative to the bursts and can tell if it is not equidistant between them, indicating a displacement from the centerline of the track. The distance between the transducer and the track centerline is the PES and it is that signal that is fed back to the servo mechanism for purposes of correcting the transducer's position. The servo controller, which determines the PES, calculates a correction value and sends it to the DAC, has a finite, frequency dependent, position error correcting capability. Thus, if the signal sent from the transducer indicating its deviation from the centerline is a complicated oscillatory waveform (as a function of deviation vs. servo wedge location), the closed loop servo mechanism will be unable to adequately correct the misalignment of the transducer. One approach to avoiding the necessity of the servo mechanism having to track a complicated oscillation, is to remove regular components of that oscillation if possible. As we shall discuss below, the oscillations that the servo mechanism is forced to follow are generally composed of two components: 1. a component that is regularly repeated at some oscillation frequency or combination of frequencies, related to the rotational frequency of the disk, and 2. a component that is random and has no regularity to it. The first such component is called repeatable runout (RRO) and the second is called non-repeatable runout (NRRO).

Ideally, each annular track should be concentric with the drive spindle about which the disk is rotating and should remain so during HDD operation. If this is the case, the PES will be zero and the closed loop servo mechanism will make no correction to the transducer's location. In practice, however, the tracks will not be concentric and corrections will have to be made. There are many reasons for this lack of concentricity. One reason of importance is a lack of concentricity of the track with the spindle or failure of the track to be circular to begin with. These will lead to the track having an eccentric motion about the spindle during disk rotation.

Referring to FIG. 2, there is shown a hard disk (1) whose center is nominally at the center of the spindle opening (12). Because of some unspecified rotational deviation, the disk is actually rotating about a displaced center (14). As a result, the transducer is tracing out the broken line (15) when it should be tracking the originally concentric tracks (17). As the transducer's broken line trajectory passes over servo wedges (16) at points of intersection (16a), (16b), etc., the servo mechanism will try to move the transducer back into alignment with the tracks (17). An observation of the transducer, for a period of time, at a fixed point in space will show an oscillatory motion. Other reasons for such transducer oscillations include factors such as disk slippage, disk warpage and even poorly written servo data. Although the effect of track eccentricity is problematic, it has the virtue of being periodic and, as noted above, it is designated repeatable runout (RRO).

RRO at any point on the disk within a circular track can be defined as the motion of that point relative to another point that is fixed in space. The problem caused by RRO is due to the fact that the HDD transducer is trying to follow the motion of that point. The periodicity of RRO allows for the possibility of its elimination by any of several means, some of which will be discussed below. Another source of positional error is called non-repeatable runout (NRRO), which is caused by various random and environmental effects on the motion of the disk and which is not easily eliminated. Clearly, however, if the effects of RRO can be significantly diminished, then it is easier for the servo mechanism to correct for the NRRO.

If the RRO is slight, the servo mechanism can compensate for it by use of the closed loop servo mechanism within the HDD. However, if the RRO exceeds some predetermined tolerance defined by the manufacturing parameters of the disk drive, then the servo mechanism is incapable of completely correcting for it and the disk drive will not operate properly.

One approach to compensating for RRO is to predetermine the amount of RRO present at each servo sector and feed that information, once and for all, into the servo mechanism in advance of the drive use. This is done by inputting data into an array that stores data relevant to where the transducer will be when it reaches the location of servo wedge i+1, based on a calculation done at the position of servo wedge i. Thus, when the transducer is over wedge i, is corrected for where it is about to be positioned. This is called a static feed forward compensation. Alternatively, this feed forward compensation can occur at various times during the drive use, which is called adaptive feed forward compensation.

By feeding these compensated values into the servo mechanism (eg., storing them in an array), the servo mechanism will regard those stored values of RRO as being normal, so to speak, and will not try to "correct" them. Of course, any amount of NRRO that occurs during drive operation will now be determined relative to this stored RRO and the PES for that additional misalignment will be acted upon by the servo mechanism.

Determining the best PES values to feed forward into the system to compensate for RRO is not a simple matter. If the system is simply run and measurements of PES values are taken at selected points along each track, the PES values measured by the system will include not just the RRO but all other misalignments as well. One way of determining the RRO effects while ignoring other perturbing misalignments, is to determine a waveform for the PES as a function of disk angle of rotation over several rotations, and then average their results. Since NRRO is typically random in nature, the averaging will tend to eliminate their effects. Once the average oscillation waveform is determined, an analysis of the harmonic content of this waveform can be done. Such an harmonic analysis will display the RRO component as various multiples of the disk rotational frequency. When doing the rotation averages prior to such a harmonic analysis, it is advantageous to eliminate as much of the NRRO as possible by setting the servo mechanism at a low bandwidth condition, so that the actuator mounted transducer will have a lowered sensitivity to random effects. The present inventor, in Drouin (U.S. Pat. No. 5,550,685), which is incorporated herein in its entirety by reference, described such a method for compensation of RRO, using a Fourier transform and back transform to identify and compensate the effects of various frequency components of the RRO waveform. This method required an identification of the particular frequencies to be compensated, required an extensive computation for each frequency identified and required the application of a Fourier transform algorithm. As compared to the method of the present invention to be described below, this previous method was computationally intensive, utilized much storage capacity and was time consuming. As is briefly described below, however, there is much additional prior art to be found that describes other forms of such algorithms and methods to apply them.

Smith et al. (U.S. Pat. No. 6,700,728) shows a feed forward system using the average of PES values. Smith is particularly concerned with correcting for PES outliers, whose extreme values can adversely affect attempts to compensate for RRO.

Cho et al. (U.S. Pat. No. 7,042,827) discloses a method of calculating feed forward values by running a disk drive at a variety of speeds.

Cunningham et al. (U.S. Pat. No. 5,854,722) teaches feed forward correction signals between servo sectors. More specifically, however, Cunningham is concerned with a method for compensating for effects of the arc-like path of the actuator arm as it tracks along the surface of the disk.

Melkote et al. (U.S. Pat. No. 6,999,267) describes RRO compensation iteratively learned for each servo sector using the previously learned value for each sector and PES for each sector and adjacent sectors.

Melkote et al. (U.S. Pat. No. 6,826,006) discloses a method of calculating RRO cancellation values base on values for each servo wedge.

Melkote et al. (U.S. Pat. No. 6,924,959) shows a method of estimating RRO values based on current PES values and a previous estimation of RRO errors.

Yi et al. (U.S. Pat. No. 7,196,864) describes a first servo-loop compensator that processes PES values during RRO calibration.

Li et al. (U.S. Pat. No. 7,286,317) teaches compensation for RRO by measuring timing between information read on the disk.

None of this prior art achieves the ends desired in the present invention, namely an accurate, simple and computationally less time and storage-space consuming method to eliminate the effects of RRO.

SUMMARY OF THE INVENTION

It is a first object of this invention to minimize the effects of repeatable runout (RRO) in a hard disk drive.

It is a second object of the present invention to achieve the first object by applying a simple algorithm that provides good performance while requiring reduced processor resources and a smaller number of necessary computations.

It is a third object of the present invention to provide a method of switching the inputting of the correction terms between the DAC summing junction and the PES summing junction, whereby in the former case the correction results in the transducer following the RRO, while in the latter case the transducer effectively follows a newly defined track center target position with respect to which the RRO is removed.

It is a fourth object of the present invention to provide a method of significantly reducing the computational convergence time by dividing the surface of the disk into a plurality of zones, with each zone having its own array of feed forward compensation values.

The objects of the present invention are achieved by a method that includes application and implementation of an algorithm that is only minimally computationally intensive. As a result, the method is characterized by rapid execution time and requires a small amount of processor code and minimal data memory space. To obtain an understanding of the algorithm, its objects, its implementation and its computed quantities, we will first look at FIG. 3.

In FIG. 3, rectangular boxes schematically represent electromechanical actions within a functioning HDD that includes the RRO correcting mechanisms of the present invention. These actions are implemented through the closed loop servo mechanism (labeled "controller") (60), by use of the stored feed-forward algorithm (50), whose operation will be explained below, so that the operation of the "plant" (200), representing the actuator/transducer/spindle-drive, etc. of the HDD, can be effectively controlled.

The position signal (75) of the transducer's actual present location is determined from the servo data embedded within current servo wedge "n", where n is an integer between 1 and some total number of wedges characterizing a disk. The digital output identifying this position is algebraically combined at a summing junction (90) with a reference position signal (70) denoting the "target" position of, typically, the track centerline at which the transducer is required to be and subsequently to follow. It is to be noted, that the choice of a reference signal input (70) at this summing junction will alter the particular tracking line that the head will attempt to follow and the reference signal can act in an adaptive manner, referring to a previously computed tracking position rather than to a fixed position.

The position signal (75) is subtracted from the target position (70) at the summing junction (90) to create a PES (80) (difference between where you want to be and where you are), which is fed into the controller (60) to implement the current correction at the current wedge, and also into the feed-forward algorithm (50) to compute the correction term to be applied at the following wedge. The PES so generated, represents the total misalignment of the transducer that results from all perturbations to the track, RRO and NRRO. In a prior art HDD, which does not include the feed-forward mechanism of the present invention, the controller would produce a servo compensation signal that would not remove the influence of RRO from the total source of misalignment. We shall, in effect, now want the RRO portion to be "ignored" or compensated for, which is the task of the feed-forward algorithm (50). It is to be noted that for use in the computational portion of the algorithm, which is meant to eliminate the RRO portion of the PES, the PES may be computed as the result of averaging position measurements at a particular servo wedge over some selected number of complete disk rotations. Such an average will substantially eliminate the random effects of NRRO, so that the PES value used for correction purposes will be correcting the RRO effects without the NRRO perturbations.

The implemented feed-forward algorithm (50) injects an iteratively computed feed-forward value (digital) representing that part of the misalignment of the transducer due only to the RRO. This part is summed (95) with the compensation output from the controller (digital) at the DAC (100) and the sum (now an analog signal) is input to the plant mechanism (200), more specifically to a voice coil motor (VCM) which is not shown here.

In order for the feed-forward values to correctly compensate for the effects of RRO, they must include gain factors (called herein "gain coefficients") that match the behavior of the servo mechanism to the various harmonics of the RRO that will be separately canceled. These gain coefficients must be determined empirically from the actual operational behavior of the system, which in the present invention is done through the plant Bode plot (see FIG. 4). At this point, the sum provides the necessary control to bring the actuator-mounted transducer back into alignment with the track centerline (or other appropriate target position), but now it is only necessary to correct for the smaller NRRO portion of the PES. Note also, that the output of the feed forward algorithm implementation (50) can be chosen to be applied to summing junction (95) instead of summing junction (90). This choice of (95) will cause the plant to follow the RRO present, resulting in a reduction in the RRO of the PES. Alternatively, the output of the feed forward (50) may be applied to the summing junction (90), in which case the system will effectively define a new target tracking line with the RRO component removed. This entire operation is repeated at each servo wedge on a data track throughout each disk revolution. It is further noted that the data tracks can be subdivided into zones within each of which a separate set of corrective data can be calculated.

The feed-forward algorithm can be expressed in pseudocode as follows:

$$DAC[n]=ControlOutput[n]+FFout[n] \quad 1.$$

. . . Other controller calculations and output sent to DAC $$FFout[n+1]=(FF[n+delay]*FFGain[0])+(FF[n+delay+1]*FFGain[1])+(FF[n+delay+2]*FFGain[2])+ \quad 2.$$

$$FF[n]=FF[n]+PES[n] \quad 3.$$

Where:

| | |
|---|---|
| FFout[ ] = | Feed forward value added to servo control output |
| FF[ ] = | Array of feed-forward values, one for each servo wedge |
| FFGain[ ] = | Array of feed-forward gain coefficients, one element for each coefficient term |
| delay = | wedge delay constant, to take into account response time delays in the plant operation |
| n = | current wedge number |

Note that line 3 of the pseudocode above is the calculation that accumulates the PES remaining at each servo sector as the algorithm converges. Observe that if the PES at a particular sector, n, becomes 0, the value of FF[n] will no longer change. In the steady state condition, where the algorithm has converged and RRO is fully compensated, the FF values at all servo sectors will each individually remain close to their respective converged values. Note also, that the purpose of computing line 1 of the pseudocode before line 2 of the pseudocode is so that the control output at wedge n can be sent to the DAC as soon as possible without waiting for the FFout [n] to be computed. After the DAC output has been sent, the calculations of lines 2 and 3 are pre-computed for use at the next servo sector, n+1.

Thus, this iterative algorithm is executed, during disk rotation, for each current servo wedge location [n] and the feed forward value it computes at that location is input into the array location appropriate to the following servo wedge [n+1]. Note that the convergence of the algorithm can be accelerated by making the gain coefficients variable, so that an initial set of gain coefficients is chosen and then is successively reduced as the input error gets smaller.

To better understand the workings of this computation, let us look at equation 1. above. Here, DAC [n] refers to the total analog signal that ultimately moves the actuator to correctly position the transducer when the transducer is at the nth servo wedge. This signal is made up of a sum of two parts: ControlOutput[n]+FFout[n]. The role of these two parts can be understood by referring now to FIG. 2, which shows that ControlOutput[n] is the quantity fed into the summing junction (95) by the controller (60), while FFout[n] is the result of the feed forward computation in (50).

We now examine line 2 of the pseudocode: FFout[n+1]= (FF[n+delay]*FFGain[0])+(FF[n+delay+1]*FFGain[1])+ (FF[n+delay+2]*FFGain[2])+ . . . . This line of pseudocode represents the computed value of FFout that is fed-forward for use by the transducer at the next servo wedge, [n+1]. It will be combined with ControlOutput[n+1] to produce DAC[n+ 1]. Thus, at current wedge n, two things occur, the transducer is properly positioned by DAC[n], and the RRO correction to be used at the next wedge, FFout[n+1] is computed. This value at n+1 will be used at the next wedge.

FFout[ ] is computed using the gain and phase data acquired from the Bode plot for the system and the computation will be discussed in the following sections. This data in effect instructs the algorithm how to match the control effects of the servo mechanism with the particular harmonic being compensated. Note that it is possible, and often advantageous, to divide the disk surface into radially separate zones, with each zone having its own separate FF[ ] array.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 shows a schematic illustration of a prior art magnetic disk drive, showing a mounted disk with typical tracks and the embedded servo wedges within the tracks.

FIG. 2 schematically shows a hard disk rotating eccentrically so that its servo wedges must realign the transducer.

FIG. 6 is a C-code implementation of the feed forward computation that would produce the results of FIG. 4.

FIG. 7 is a table illustrating the results of applying the feed-forward algorithm to an exemplary HDD.

DESCRIPTION OF THE PREFERRED EMBODIMENT

The present invention teaches a method of operating a hard disk drive (HDD) using disks having a plurality of substantially radially concentric annular tracks, in each of which there is embedded servo track information within some number of regularly spaced wedges of small angular width. Note, this number will be denoted "wpr", for "wedges per revolution", in the code written below.

The information stored within these wedges is used to align a read/write transducer relative to a desired radial position on a track (the "target" position). The method of the invention provides a quick and simple mechanism for making repeatable runout (RRO) corrections at each servo wedge location for the chosen disk tracks (e.g. while at a wedge denoted "n") and computing new such corrections while at that servo wedge and feeding these corrections forward to be accessed and used at the next servo wedge (e.g. a wedge denoted "n+1"). In this way, the PES of the read/write transducer, which includes both RRO and non-repeatable runout (NRRO), can be reduced by the amount of the RRO correction ultimately at each wedge position on a track. As a result, the servo-mechanism need only align the transducer relative to the RRO of a track, rather than relative to a fixed point on the apparatus.

Figure 3:
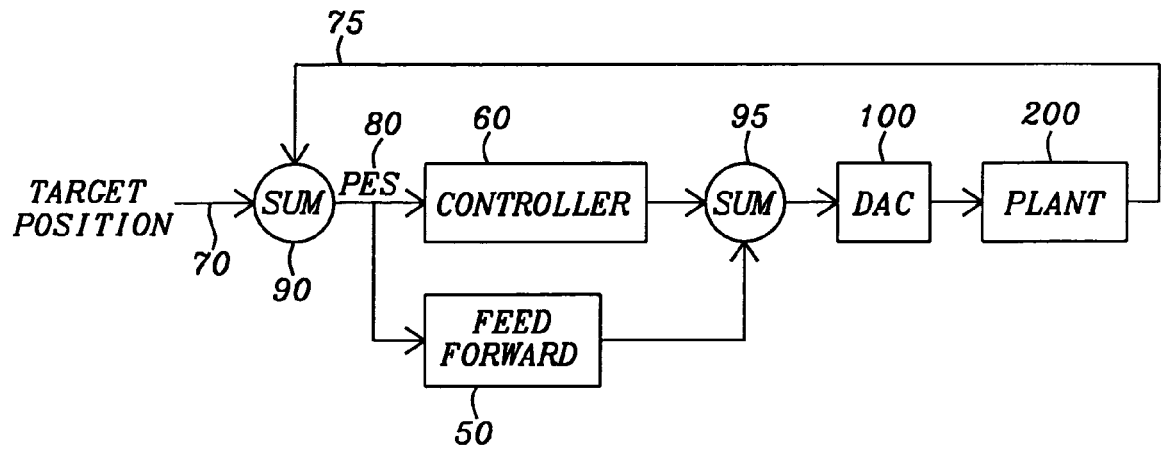
FIG. 3 shows in schematic form a block diagram of the HDD system and the process by which RRO is canceled from the PES signal of the transducer within the system.
Figure 4:
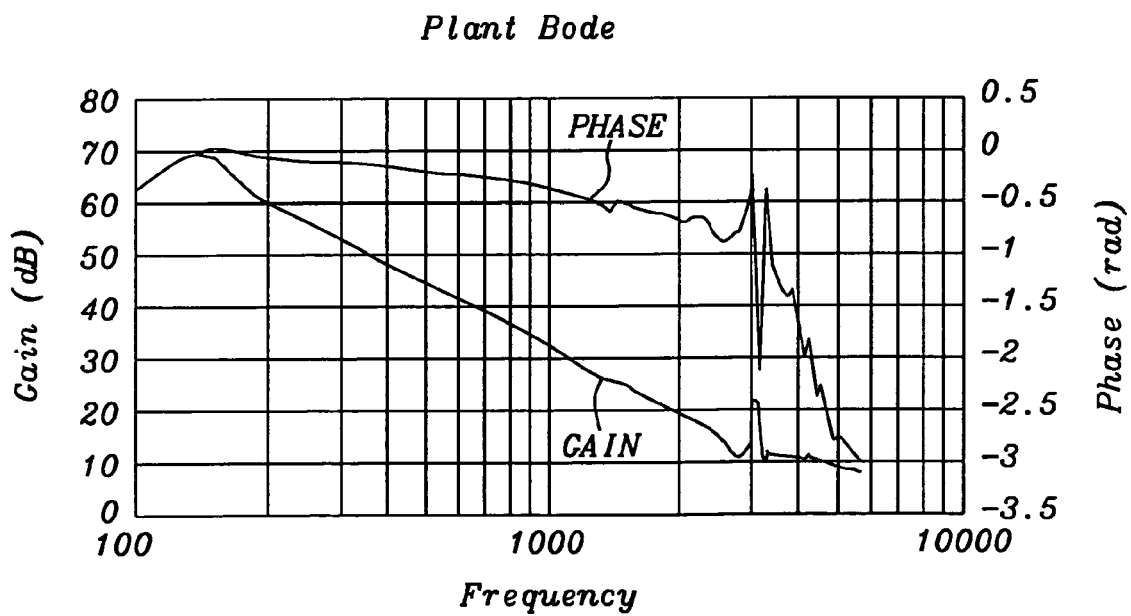
FIG. 4 is a schematic graph showing phase and gain components of a Bode plot for a typical hard disk drive exhibiting RRO during disk rotations.

As shown in line 2 of the pseudocode above, the output of the feed-forward algorithm, FFout[ ], is computed by an iterative sum requiring the gain coefficients FFGain[ ]. These gain coefficients are computed using the amplitude and phase information contained within the Bode plot of the HDD, such as the exemplary plot shown in FIG. 4, in which the upper curve is phase and the lower curve is gain. The Bode plot is obtained from the system performance in a way that is not sensitive to the RRO or NRRO of a particular disk. In fact, the Bode plot can be estimated for a particular mechanical system and, if the estimate is a reasonable approximation to the actual system behavior, the FF algorithm will perform reasonably well. The algorithmic computation of the gain coefficients proceeds according to the following lines of pseudocode:

$FFGain[i]=D[i]-average(D[1], D[2], D[3], \ldots)$     4.

$D[i]=C[i]/C[1]$     5.

$C[i]=X[1,i]+X[2,i]+X[3,i]+$     6.

$X[n,i]=(1/G[i])*\{\cos(-P[i]+2*pi*n*(i-1)/wpr)+\cos(P[i]+2*pi*n*(wpr-i+1)/wpr)\}$     7.

Where:

n=1 to $N_h$, the maximum harmonic of interest;

i=1 to $N_g$, the maximum feed-forward gain coefficient chosen;

wpr=number of servo wedges per revolution;

G[ ]=array of plant gain;

P[ ]=array of plant phase;

Average (D[1], D[2], D[3], ...) represents the average value of all the values of D[ ], up to $D[N_g]$, where $N_g$ is the number of gain coefficients chosen to be used in the algorithm.

Figure 5:
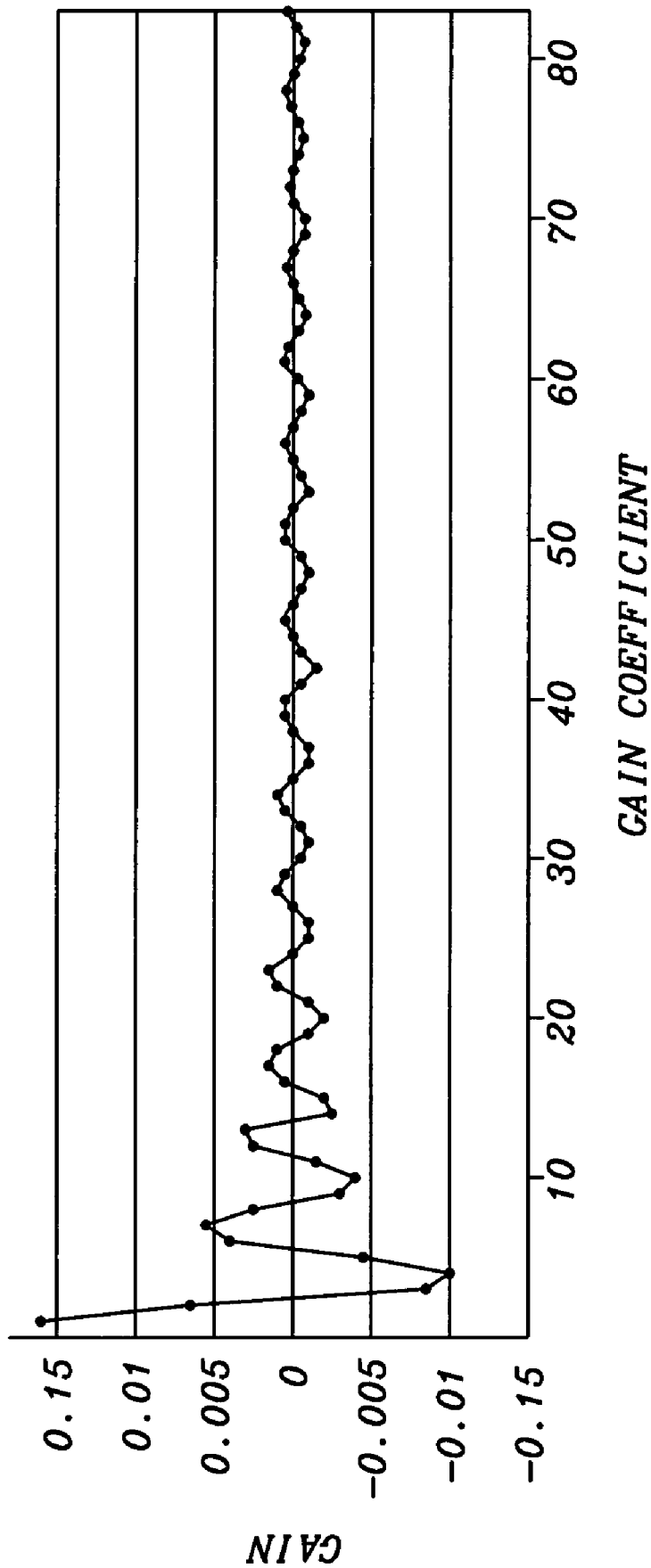
FIG. 5 is an exemplary array of feed-forward coefficients that could be determined from a Bode plot such as shown in FIG. 3.

Referring now to FIG. 5, there is shown a table containing exemplary computed values of C[i], D[i] and FFGain[i]. These computed values correspond to an exemplary 2.5" 145 kTPI HDD in which the rotation frequency of the disk and the first harmonic is 70 Hz. The table has 30 rows, each row corresponding to a harmonic index, n. Thus, n goes from 1 to 30. The array has 15 columns in total, of which the last 11 correspond to the index i, which labels the chosen number of gain coefficients:

Column 1: n values

Column 2: corresponding frequencies

Column 3: Bode plot gain in dB, G[ ]

Column 4: Bode plot phase in radians, P[ ]

Column 5: Identifies the final 11 columns, i=1 to 11, as C[i], which is the "Sum of X[m,i]", for m=1 to n Column 6: X[1,i]

Column 7: X[1,i]+X[2,i]

Columns 8 through 15, as noted above, include additional values of X[n,i].

It is to be noted that the number of harmonics to consider when computing the gain coefficients can be varied. In some circumstances it may be desirable to compute gain coefficients that were independent of (did not include) a particular harmonic frequency. This would be the case if there was a resonance at that particular harmonic frequency. This can be done by either terminating the calculations prior to that particular frequency, or by setting the magnitude of that harmonic to a very large number. The number of harmonics that should be used in calculating the gain coefficients can be determined experimentally by observing the performance of the FF[ ] algorithm with various numbers of harmonics included.

A schematic graph just below the table represents raw gain coefficient value vs. gain coefficient number. These raw gains are then scaled by an appropriate value to obtain the FFGain values used in the computation. For the example shown, only 5 FFGain values are used, although more or less may be used. The number of gain coefficients to use can be determined by observing the performance of the FF algorithm with various numbers of coefficients. It has been empirically observed that 5 gain coefficients is a reasonable number.

Referring to FIG. 6, there is shown the source code of an exemplary C-Code implementation of the feed-forward algorithm. This particular implementation is executed on each servo interrupt after the control output to the DAC has been executed. In this code, the value of FFout is being pre-computed for use in the following servo interrupt. The value of FFout computed in the code is added to the control output and the resulting sum is fed into the DAC. In other words, the operation:

$DAC[n]=ControlOutput[n]+FFout[n],$ in line 1 of the pseudocode is being implemented. Note that the feed-forward gain coefficients are computed from the plant Bode magnitude and phase as previously described in lines 4-7 of the pseudocode written above. The values of FFShift and FFShiftX in the C-code are chosen for a particular mechanical plant and variable scaling to give sufficient computation value dynamic range and loop stability. Such empirical techniques are readily practiced by those skilled in the art of servo control system engineering. Note also that the C-code contains the logical quantities "ApplyOn" and "AcquireOn" that respectively control the conditions under which the algorithm is applied and under which the computation is terminated. Specifically, set AquireOn=FALSE and ApplyOn=TRUE when not track following or when PES is large due to an external disturbance and AcquireOn is also set to FALSE when the RRO falls below a threshold limit.

Referring to FIG. 7 there is shown a table illustrating the effects of the feed-forward algorithm on an exemplary 2.5", 145 kTPI HDD. All values are peak-to-peak measurements. PES measurements are from raw PES values input to the controller, i.e., they are PES(RRO+NRRO), that include the effects of repeatable runout as well as uncontrollable random perturbations. RRO measurements are obtained by averaging the raw PES over 25 consecutive disk rotations. Such averaging can be reasonably expected to cancel out random NRRO perturbations and leave an accurate representation of that which is periodic. As can be seen, when the algorithm is enabled, the raw PES is significantly reduced and the RRO portion is even further reduced.

Figure 8A:
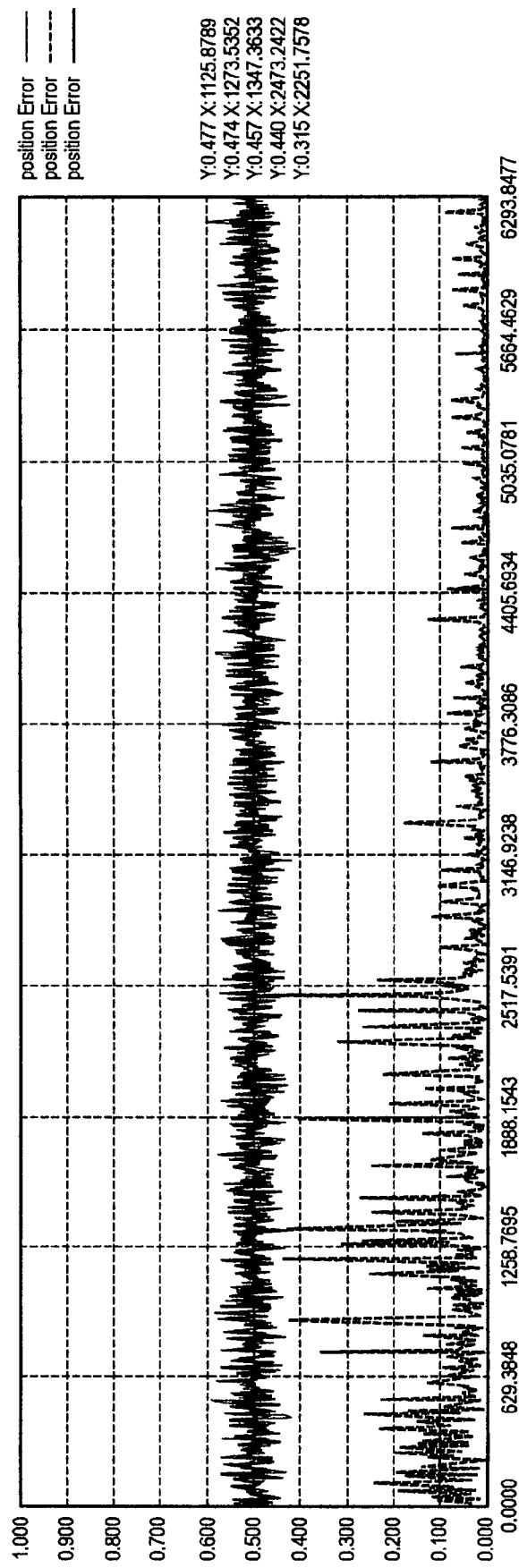
FIGS. 8a and 8b shows two sets of traces that indicate the degree to which the effects of RRO are removed from a HDD by application of the present invention.
Figure 8B:
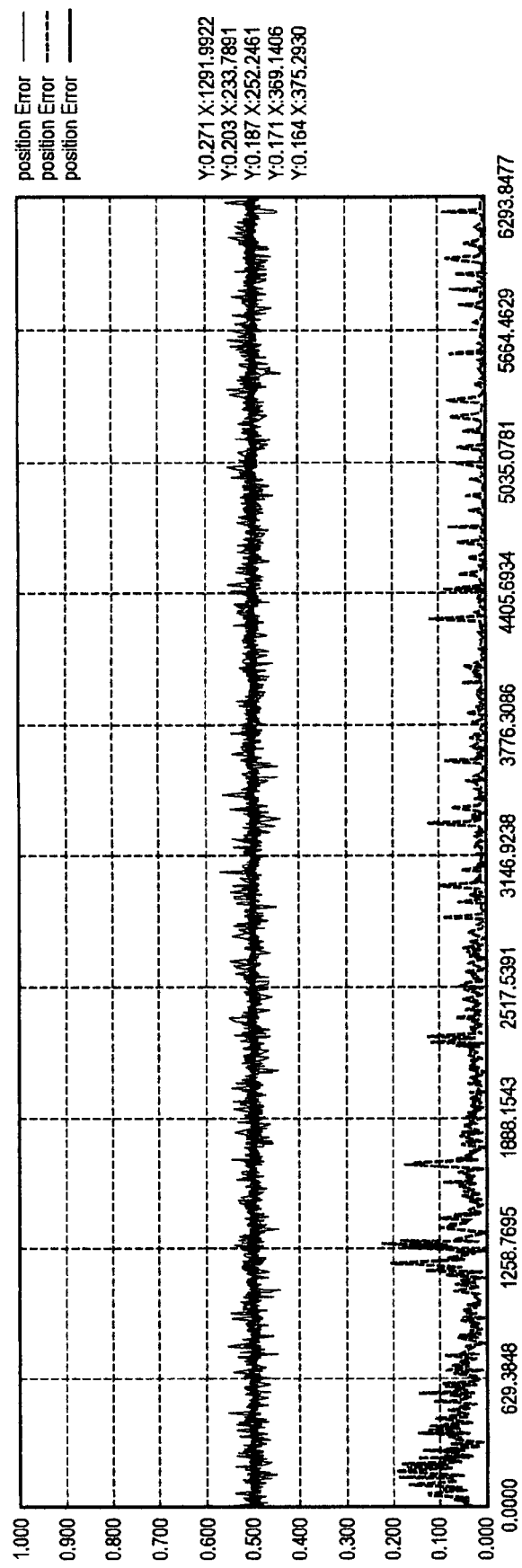

Finally, FIG. 8a is a graphical illustration showing the instantaneous values of the raw PES and RRO portion of the PES, with the corrections of the feed-forward algorithm disabled. FIG. 8b is the same set of values, with the feed-forward algorithm enabled.

As is finally understood by a person skilled in the art, the preferred embodiment of the present invention is illustrative of the present invention rather than limiting of the present invention. Revisions and modifications may be made to methods, constructs, materials, structures and dimensions by which repeatable runout (RRO) can be effectively eliminated from the PES response of a closed loop servo mechanism in an operating HDD, while still providing such HDD operation in accord with the present invention as provided by the appended claims.

What is claimed is:

1. A method for operating a magnetic hard disk drive comprising:

providing the disk drive, said disk drive including a motor driven rotating spindle on which a magnetic hard disk is mounted, a movable actuator assembly, a read/write transducer mounted on said actuator assembly and positionable at selected target locations on said disk by the movement of said actuator assembly and reading information stored within servo wedges thereat, and an electro-mechanical closed loop servo-control mechanism, for responding to a position error signal that contains information describing both repeatable runout and non repeatable runout and, a digital to analog converter, for controllably positioning said read/write transducer at said target disk locations; wherein said magnetic hard disk is characterized by a first plurality of radially spaced annular data tracks, which may be further subdivided into a second plurality of radial zones, wherein each said data track is located within a zone and wherein each said data track has, formed therein, a third plurality of said servo wedges, that are regularly spaced circumferentially and of small angular width, wherein said servo wedges contain embedded information defining radial and angular positions within a track; then, rotating said disk at a rotational frequency and a. selecting a zone;
b. selecting a data track within said zone;

c. sending said transducer to a target position at a servo wedge, "n", on said data track and determining a position error signal value at said target position; then d. acquiring a repeatable runout correction term at said servo wedge "n" target position and adding said correction term to said position error signal value at a summing junction, whereby the effects of a repeatable runout component of motion of said transducer at said target position is compensated; then, while still at said target position "n", e. using a Bode plot of amplitude and phase performance characteristic of said HDD, computing $N_g$ feed-forward gain coefficients for $N_h$ harmonics characterizing a repeatable runout correction term for an immediately following servo wedge; then f. using said feed-forward gain coefficients computing a feed-forward repeatable runout correction term characterizing repeatable runout for said immediately following servo wedge; then g. feeding forward and storing said correction term for use at said immediately following servo wedge.

2. The method of claim 1 further including the following steps:

h. after completion of step g., sending said transducer to a target position at said immediately following servo wedge and repeating steps d. through g, where said target position "n" now denotes a target position at said immediately following servo wedge; then, i. repeating steps c through h until all the repeatable runout at all servo wedges on said selected data track has been corrected.

3. The method of claim 2 further including a step of selecting additional data tracks within a zone and repeating steps b through h until the repeatable runout at all servo wedges for all tracks within a zone has been corrected.

4. The method of claim 3 further including a step of selecting additional zones and repeating steps a through h until the repeatable runout at all servo wedges on all tracks in all zones has been corrected.

5. The method of claim 1 wherein said position error signal is determined by a method comprising:

reading the servo data embedded in said servo wedge n, said servo data providing the actual position of said read/write head;

algebraically summing said servo data with a reference position value; wherein said reference position value is a track centerline position or is a track centerline position from which a previously computed repeatable runout correction has been subtracted.

6. The method of claim 5 wherein said position of said read/write head is an average of positions obtained by repeated identical measurements at said servo wedge n over a selected number of disk rotations, said average thereby substantially eliminating effects of non-repeatable runout.

7. The method of claim 1 wherein the choice of said summing junction allows addition of the feed-forward correction term to be applied either at the input of said digital to analog converter or to the input of said servo-control mechanism.

8. The method of claim 1, wherein addition of said correction term at said digital to analog converter results in said transducer accurately following the repeatable runout motion of the track, whereas addition of said correction term at said servo-control mechanism results in a newly defined track centerline position in which the repeatable runout is removed.

9. The method of claim 1 wherein said feed-forward correction terms are computed by the following operations:
- determining an array of a selected number of gain coefficients using the amplitude and phase of a Bode plot of system operation; then
- initializing an array of feed-forward correction terms; then
- iteratively computing values for said array of feed-forward correction terms, using said computed gain coefficients, the iteration being carried out at each servo wedge location as an iterative sum over a chosen number of harmonics.

10. The method of claim 9 wherein only a single gain coefficient is used for all servo wedges within a given track within a given zone.

11. The method of claim 9 wherein five gain coefficients are computed and used for all servo wedges within a given track within a given zone.

12. The method of claim 9 wherein gain coefficients are varied during said iterations, so that convergence of the feed-forward coefficient is accelerated.

13. The method of claim 12 wherein said variable gain coefficients are determined by a method comprising:
- defining an initial series of gain coefficients for each zone;
- using said gain coefficients, computing a set of feed-forward correction terms for all servo wedges within a representative set of tracks within each zone;
- reducing said initial series of gain coefficients and recomputing said feed forward correction terms.

14. The method of claim 9 wherein said array of feed-forward correction terms is initialized at power on with previously computed converged data.

15. The method of claim 9 wherein said Bode plot is an estimate of actual hard disk drive operation.

16. A magnetic hard disk drive comprising:
- a motor driven rotating spindle on which a magnetic hard disk is mounted, a movable actuator assembly, a read/write transducer mounted on said actuator assembly and positionable at selected target locations on said disk by the movement of said actuator assembly and reading information stored within servo wedges thereat, and an electro-mechanical closed loop servo-control mechanism, for responding to a position error signal that contains information describing both repeatable runout and non repeatable runout and, a digital to analog converter, for controllably positioning said head at said target disk locations; wherein
- said magnetic hard disk is characterized by a first plurality of radially spaced annular data tracks, which may be further subdivided into a second plurality of radial zones, wherein each said data track is located within a zone and wherein each said data track has a third plurality of regularly spaced servo wedges of small angular width formed therein, said servo wedges containing embedded information defining radial and angular positions within a track; and wherein
- said closed loop servo mechanism contains a set of gain values determined from a Bode plot characterizing the physical operation of the hard disk drive; and
- using said gain values, said closed loop servo mechanism generates an array of feed-forward correction terms for correcting misalignment of said transducer caused by repeatable runout of said disk; and wherein
- said closed loop servo mechanism includes a storage array for storing said array of computed feed-forward correction terms; and wherein
- said closed loop servo mechanism accepts said position error signal from said transducer and adds said feed-forward correction terms to said position error signal at a summing junction.

17. The magnetic hard disk drive of claim 16 where said position error signal is constructed by subtracting a reference value from a position location generated by said transducer.

18. The magnetic hard disk drive of claim 16 wherein said position error signal is determined by a method comprising:
- reading the servo data embedded in said servo wedge n, said servo data providing the actual position of said read/write transducer;
- algebraically summing said servo data with a reference position value; wherein
- said reference position value is a track centerline position or is a track centerline position from which a previously computed repeatable runout correction has been subtracted.

19. The magnetic hard disk drive of claim 18 wherein said position of said read/write transducer is an average of positions obtained by repeated identical measurements at said servo wedge n over a selected number of disk rotations, said average thereby substantially eliminating effects of non-repeatable runout.

20. The magnetic hard disk drive of claim 16 wherein the choice of said summing junction allows addition of the feed-forward correction terms to be applied either at the input of said digital to analog converter or to the input of said servo-control mechanism.

21. The magnetic hard disk drive of claim 20, wherein addition of said feed-forward correction terms at said digital to analog converter results in said transducer accurately following the repeatable runout motion of the track, whereas addition of said feed-forward correction terms at said servo-control mechanism results in a newly defined track centerline position in which the repeatable runout is removed.

22. The magnetic hard disk drive of claim 16 wherein said feed-forward correction terms are implemented by the following operations:
- determining an array of a selected number of gain coefficients using the amplitude and phase of a Bode plot of system operation; then
- initializing an array of feed-forward correction terms stored within the servo mechanism; then
- iteratively computing values for said array of feed-forward correction terms, using said computed gain coefficients, the iteration being carried out at each servo wedge location as an iterative sum over a chosen number of harmonics.

23. The magnetic hard disk drive of claim 22 wherein only a single gain coefficient is used for all servo wedges within a given track within a given zone.

24. The magnetic hard disk drive of claim 22 wherein five gain coefficients are computed and used for all servo wedges within a given track within a given zone.

25. The magnetic hard disk drive of claim 22 wherein gain coefficients are varied during said iterations, so that convergence of the feed-forward correction term is accelerated.

26. The magnetic hard disk drive of claim 25 wherein said variable gain coefficients are determined by a method comprising:
   defining an initial series of gain coefficients for each zone;
   using said gain coefficients, computing a set of feed-forward correction terms for all servo wedges within a representative set of tracks within each zone;
   reducing said initial series of gain coefficients and recomputing said feed-forward correction terms.

27. The magnetic hard disk drive of claim 22 wherein said array of feed-forward correction terms is initialized at power on with previously computed converged data.

28. The magnetic hard disk drive of claim 22 wherein said Bode plot is an estimate of actual hard disk drive operation.

* * * * *